United States Patent
Derbeko et al.

(10) Patent No.: US 10,044,744 B1
(45) Date of Patent: Aug. 7, 2018

(54) COVERT STORAGE CHANNEL COMMUNICATION BETWEEN COMPUTER SECURITY AGENT AND SECURITY SYSTEM

(71) Applicant: EMC Corporation, Hopkinton, MA (US)

(72) Inventors: Philip Derbeko, Modiin (IL); Yuri Manusov, Beer Sheva (IL); Naomi Eskira, Beer Sheva (IL); Sorin Faibish, Newton, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 205 days.

(21) Appl. No.: 15/138,807

(22) Filed: Apr. 26, 2016

(51) Int. Cl.
*H04L 29/06* (2006.01)

(52) U.S. Cl.
CPC ........ *H04L 63/1433* (2013.01); *H04L 63/145* (2013.01); *H04L 63/1416* (2013.01)

(58) Field of Classification Search
CPC   H04L 63/1433; H04L 63/1416; H04L 63/145
USPC ......................................................... 726/23
See application file for complete search history.

(56) References Cited

U.S. PATENT DOCUMENTS

| | | | | |
|---|---|---|---|---|
| 9,027,135 | B1* | 5/2015 | Aziz | H04L 63/1408 726/23 |
| 9,251,343 | B1* | 2/2016 | Vincent | G06F 21/575 |
| 9,628,498 | B1* | 4/2017 | Aziz | H04L 63/1408 |
| 2007/0006282 | A1 | 1/2007 | Durham et al. | |
| 2008/0120499 | A1 | 5/2008 | Zimmer et al. | |
| 2011/0107423 | A1 | 5/2011 | Kolar Sunder et al. | |
| 2011/0320816 | A1* | 12/2011 | Yao | G06F 21/316 713/171 |
| 2012/0254993 | A1 | 10/2012 | Sallam | |

(Continued)

FOREIGN PATENT DOCUMENTS

WO     2012135192 A2     10/2012

OTHER PUBLICATIONS

RSA, "RSA ECAT: Deep Endpoint Threat Visibility & Detection," EMC Corporation, Data Sheet, Jul. 2015, 3 pages.

(Continued)

*Primary Examiner* — Harunur Rashid
*Assistant Examiner* — Sakinah White Taylor
(74) *Attorney, Agent, or Firm* — Ryan, Mason & Lewis, LLP

(57) ABSTRACT

A processing device in one embodiment comprises a processor coupled to a memory and is configured to intercept a storage communication directed over a storage channel between a potentially infected machine and an associated storage system, and to determine if the intercepted storage communication is from a security agent deployed on the potentially infected machine. If the intercepted storage communication is from the security agent, at least a portion of the communication is provided to a security system. If the intercepted storage communication is not from the security agent, the communication is forwarded to the storage system. Accordingly, the security agent is configured to communicate with the security system using storage communications sent over the storage channel in a manner that avoids detection of the security agent by malware that may be installed on the machine and configured to monitor network communications.

20 Claims, 5 Drawing Sheets

(56) References Cited

U.S. PATENT DOCUMENTS

| | | | |
|---|---|---|---|
| 2012/0255017 A1* | 10/2012 | Sallam | G06F 21/575 |
| | | | 726/24 |
| 2012/0255018 A1 | 10/2012 | Sallam | |
| 2013/0283381 A1 | 10/2013 | Thadikaran et al. | |
| 2013/0333040 A1 | 12/2013 | Diehl et al. | |
| 2014/0351545 A1* | 11/2014 | Nakajima | G06F 3/0607 |
| | | | 711/170 |
| 2015/0095592 A1* | 4/2015 | Okajima | G06F 3/0626 |
| | | | 711/154 |
| 2015/0235026 A1 | 8/2015 | Klein | |
| 2016/0283118 A1* | 9/2016 | Bhagwat | G06F 3/065 |

OTHER PUBLICATIONS

VMware Developer Center, "I/O Vendor Partner Package," https://developercenter.vmware.com/vmware-ready-programs/iovp, Apr. 14, 2015, 3 pages.

vmware.com, "VMware ESXi," https://www.vmware.com/products/esxi-and-esx/overview, Apr. 14, 2016, 3 pages.

EMC, "EMC VPLEX Family: Continuous Availability and Data Mobility Within and Across Data Centers," EMC Corporation, Data Sheet, Aug. 2015, 5 pages.

\* cited by examiner

COVERT STORAGE CHANNEL COMMUNICATION BETWEEN COMPUTER SECURITY AGENT AND SECURITY SYSTEM

FIELD

The field relates generally to computer networks, and more particularly to techniques for providing security in a computer network.

BACKGROUND

Computer networks are often configured to incorporate network security systems in order to protect the networks against malicious activity. Such malicious activity can include, for example, deployment of malware that is utilized by attackers to create networks of compromised computers or "botnets."

Network security systems can be designed to protect a computer network of a large enterprise comprising many thousands of host devices, also referred to herein as simply "hosts." Such enterprise computer networks are in many cases continuously growing in size, and often incorporate a diverse array of host devices, including mobile telephones, laptop computers and tablet computers.

Moreover, recent years have seen the rise of increasingly sophisticated attacks including advanced persistent threats (APTs) which can pose severe risks to enterprises. These APTs are typically orchestrated by well-funded attackers using advanced tools to adapt to the victim environment while maintaining low profiles of activity. As a result, anti-virus software, firewalls, web proxies and other traditional security technologies typically deployed by enterprise network security systems today often fail at detecting and remediating malicious activity at a sufficiently early stage.

An important issue that arises in this context relates to communications between security agents deployed on host devices and a command and control server of a network security system. In many cases, when a host device is infected with malware, the malware can disable the security agent and mimic its expected communications, thereby further undermining security and making the malware infection significantly more difficult to detect and remediate.

SUMMARY

Illustrative embodiments of the invention advantageously provide techniques for covert communication between a security agent on a host device and a command and control server or other entity of a security system. Such an arrangement in some embodiments allows the security agent to communicate with the security system in a manner that is hidden from any malware that may be resident on the host device, thereby allowing the security system to more effectively detect and remediate malware infections.

In one embodiment, a processing device comprises a processor coupled to a memory and is configured to intercept a storage communication directed over a storage channel between a potentially infected machine and an associated storage system, and to determine if the intercepted storage communication is from a security agent deployed on the potentially infected machine. If the intercepted storage communication is from the security agent, at least a portion of the communication is provided to a security system. If the intercepted storage communication is not from the security agent, the communication is forwarded to the storage system. Accordingly, the security agent is configured to communicate with the security system using storage communications sent over the storage channel in a manner that avoids detection of the security agent by malware that may be installed on the machine and configured to monitor network communications.

Also, commands, binaries and other information can be provided from the security system to the security agent via the storage channel.

Moreover, the security agent itself can be deployed on the potentially infected machine via the storage channel under the control of the security system.

A given processing device configured with functionality for covert storage channel communication may be deployed in an enterprise computer network or other type of computer network. The corresponding security system may comprise a security analytics system or other type of network security system implemented in or otherwise associated with the computer network.

These and other illustrative embodiments described herein include, without limitation, methods, apparatus, systems, and computer program products comprising processor-readable storage media.

DETAILED DESCRIPTION

Illustrative embodiments of the present invention will be described herein with reference to exemplary computer networks and associated computers, servers, network devices or other types of processing devices. It is to be appreciated, however, that the invention is not restricted to use with the particular illustrative network and device configurations shown. Accordingly, the term "computer network" as used herein is intended to be broadly construed, so as to encompass, for example, any system comprising multiple networked processing devices.

Figure 1:
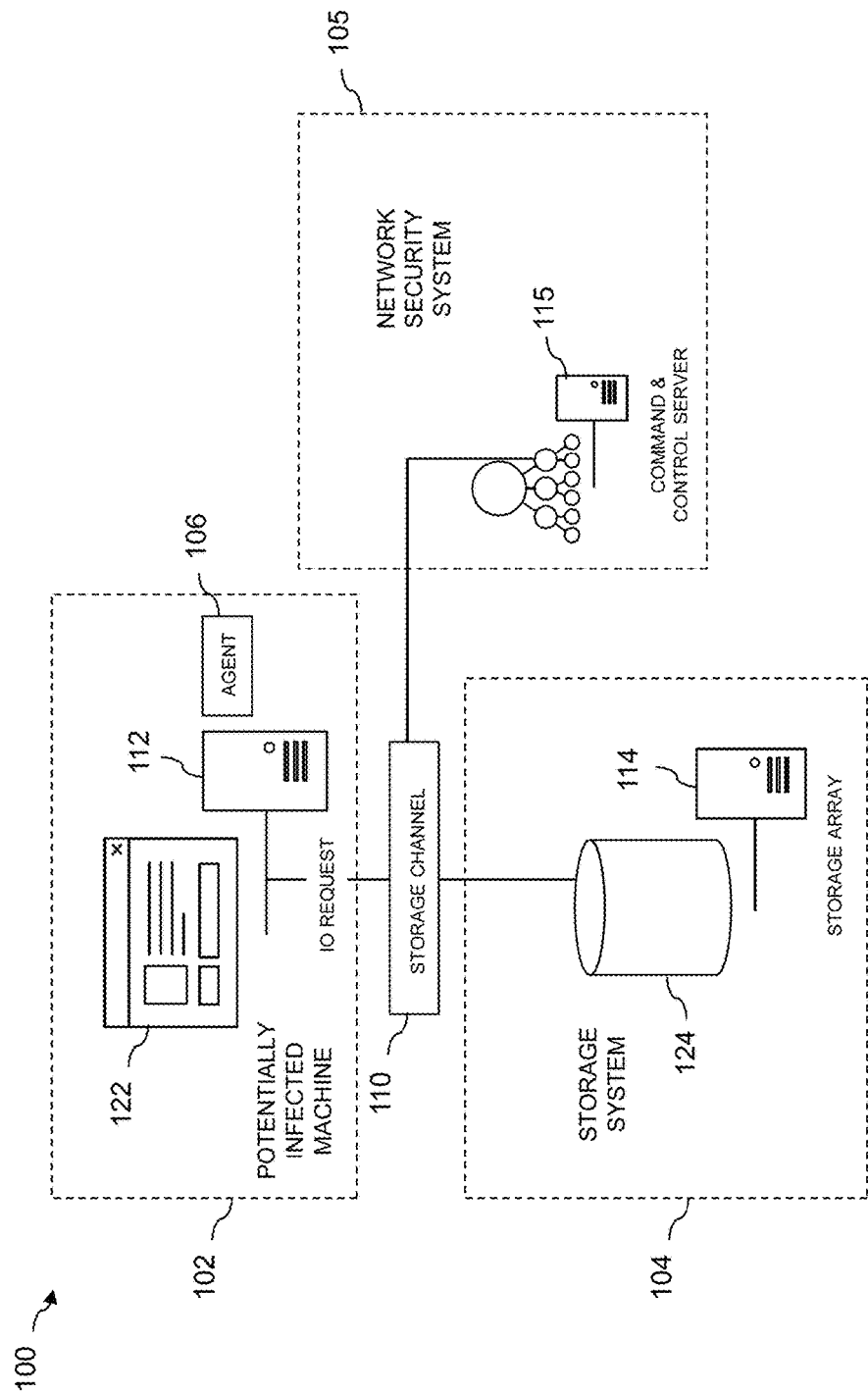
FIG. 1 shows a computer network comprising a security agent configured to communicate in a covert manner with a security system via a storage channel in an illustrative embodiment of the invention.

FIG. 1 shows a computer network 100 configured in accordance with an illustrative embodiment of the invention. The computer network 100 comprises a potentially infected machine 102 coupled to a storage system 104 and a network security system 105. The potentially infected machine 102 is also referred to herein as a host device. A security agent 106 is deployed on the potentially infected machine 102. The potentially infected machine 102 communicates with the storage system 104 via a storage channel 110 as indicated.

The potentially infected machine 102 comprises at least one processing device 112 coupled to the storage channel 110. Other processing devices of the computer network 100 in this embodiment illustratively include a processing device associated with a storage array 114 of the storage system 104, and a processing device providing a command and control server 115 of the network security system 105. Each of these processing devices comprises at least one processor coupled to a memory. Numerous other arrangements of processing devices may be used in other embodiments.

The potentially infected machine 102 illustratively provides a user interface 122 through which a user of the machine can access a storage volume 124 of the storage system 104 via the storage channel 110.

Although only a single potentially infected machine 102 is shown in the FIG. 1 embodiment, it is contemplated that a given computer network will typically include a potentially large number of such host devices.

The host devices may comprise, for example, mobile telephones, laptop computers, tablet computers, desktop computers or other types of devices, in any combination, capable of supporting users of the computer network 100. Such devices are examples of what are more generally referred to herein as "processing devices." Some of these processing devices are also generally referred to herein as "computers."

The host devices in some embodiments comprise respective computers associated with a particular company, organization or other enterprise. In addition, at least portions of the computer network 100 may also be referred to herein as collectively comprising an "enterprise network." Numerous other operating scenarios involving a wide variety of different types and arrangements of processing devices and computer networks are possible, as will be appreciated by those skilled in the art.

Also, it is to be appreciated that the term "user" in this context and elsewhere herein is intended to be broadly construed so as to encompass, for example, human, hardware, software or firmware entities, as well as various combinations of such entities.

Each host device is assumed to be configured to communicate with one or more storage devices of a storage system over at least one storage channel and may have a security agent deployed thereon. Accordingly, description herein relating to the potentially infected machine 102 can apply in some embodiments to each of a plurality of additional potentially infected machines of the computer network.

It should be noted in this regard that the term "potentially infected machine" is intended to be broadly construed, and may encompass, for example, a machine that is actually infected with malware or a machine that is susceptible to infection by malware. It should also be noted that the term "malware" as used herein is intended to be broadly construed, and should not be viewed as limited to malware that is spread or otherwise deployed through viruses each comprising one or more malicious files.

The computer network 100 illustratively comprises portions of multiple distinct networks utilized to support communication between the potentially infected machine 102, the storage system 104, the network security system 105 and other entities not explicitly shown. For example, the computer network 100 is assumed to comprise a portion of a global computer network such as the Internet, although other types of networks can be part of the computer network 100, including a wide area network (WAN), a local area network (LAN), a satellite network, a telephone or cable network, a cellular network, a wireless network such as a WiFi or WiMAX network, or various portions or combinations of these and other types of networks. The computer network 100 in some embodiments therefore comprises combinations of multiple different types of networks each comprising processing devices configured to communicate using IP or other related communication protocols.

The storage system 104 in the present embodiment can comprise any of a variety of different types of storage including network-attached storage (NAS), storage area networks (SANs), direct-attached storage (DAS) and distributed DAS, as well as combinations of these and other storage types, including software-defined storage.

Examples of particular types of storage products that can be used in implementing a storage system in a given embodiment include VNX® and Symmetrix VMAX® storage arrays, software-defined storage products such as ScaleIO™ and ViPR®, flash-based storage arrays such as DSSD™, cloud storage products such as Elastic Cloud Storage (ECS), object-based storage products such as Atmos®, scale-out all-flash storage arrays such as XtremIO™, and scale-out NAS clusters comprising Isilon® platform nodes and associated accelerators in the S-Series, X-Series and NL-Series product lines, all from EMC Corporation of Hopkinton, Mass. Combinations of multiple ones of these and other storage products can also be used in implementing a storage system in a given embodiment.

In addition, one or more of the above-listed storage products can be used to implement at least portions of an internal memory, database or other storage arrangement of the network security system 105. For example, the network security system 105 may comprise a database configured to store internal HTTP log data of an enterprise, as well as other types of information utilized in controlling access to protected resources and otherwise providing security within the computer network 100.

The network security system 105 in some embodiments is implemented as or otherwise comprises a command and control center having multiple instances of the command and control server 115. Such a command and control center is illustratively configured to control deployment and operation of security agents on the potentially infected machine 102 and other host devices of the computer network 100.

The computer network 100 in the present embodiment is advantageously configured to provide covert communication between the security agent 106 and the command and control server 115 of the network security system 105, utilizing the storage channel 110 over which the potentially infected machine 102 normally communicates with the storage array 114 of the storage system 104. As will be described in more detail below, such an arrangement in the present embodiment allows the security agent 106 to communicate with the network security system 105 in a manner that is hidden from any malware that may be resident on the potentially infected machine 102, thereby allowing the security system to more effectively detect and remediate malware infections.

In operation, the potentially infected machine 102 generates storage communications that are directed over the storage channel 110 that exists between the potentially infected machine 102 and the storage system 104. Some of these communications actually originate with the security agent 106 and are intended for the command and control server 115 of the network security system 105, but are purposely disguised as ordinary storage communications with the storage array 114 so as to evade malware that may be resident on the potentially infected machine 102. For example, malware is often configured to monitor network communications that might take place between an infected machine and a network security system. These network communications include TCP and IP communications unrelated to the storage system. In some cases, network communications are distinguished by the use of different ports or other communication media or mechanisms than those used to communication with storage systems.

Deployed agents in conventional computer networks are typically configured to utilize such network communications to communicate with command and control servers, and accordingly the interactions of these agents with the servers can usually be detected by the malware. In such an arrangement, the malware may be able to disable the security agent and mimic its expected communications, thereby further undermining security and making the malware significantly more difficult to detect and remediate. Moreover, the command and control servers themselves can also be exposed to the attackers as a result of the detected network communications.

The present embodiment overcomes this problem by utilizing the storage channel 110 to allow the security agent 106 to communicate with the command and control server 115. These covert storage communications are carried out in a manner that does not utilize the type of network communications that are ordinarily monitored by malware.

The security agent 106 in the FIG. 1 embodiment can therefore be deployed and controlled to gather information from the potentially infected machine 102 without using network communications, and therefore without vulnerability to detection by malware. This is advantageously achieved without altering the normal network behavior of the potentially infected machine and accordingly will not interfere with the operation of behavior-based detection tools utilized by the network security system 105.

A storage communication interception mechanism associated with the storage channel 110 in the present embodiment is configured to intercept a storage communication directed over the storage channel 110, and to determine if the intercepted storage communication is from the security agent 106 deployed on the potentially infected machine 102. If the intercepted storage communication is from the security agent, at least a portion of the communication is provided to the command and control server 115 of the network security system 105. If the intercepted storage communication is not from the security agent 106, the communication is forwarded to the storage system 104 in the ordinary manner used for any such communication. This allows the security agent 106 to communicate with the security system using storage communications sent over the storage channel 110 in a manner that avoids detection of the security agent 106 by malware that may be installed on the potentially infected machine 102 and configured to monitor network communications.

Accordingly, the security agent 106 and the command and control server 115 of the network security system 105 can communicate with one another via the storage channel 110 in a covert manner not readily detectable by malware.

The graph shown in the figure near the command and control server 115 is intended to illustrate that, in this embodiment, the command and control server 115 interacts with a plurality of distinct host devices, each associated with a different storage channel. A given one of the host devices and its associated storage channel collectively correspond to one of a plurality of hierarchically-arranged nodes of the graph.

In some embodiments, the storage communications are in the format of respective input-output (IO) requests of a type that would normally be directed by the potentially infected machine 102 to the storage system 104 in the course of reading from or writing to files in the storage volume 124. Regular IO requests are detected and handled in the normal manner by the storage system 104, but "special" IO requests configured in accordance with a predetermined covert storage channel communication protocol between the security agent 106 and the network security system 105 are detected and handled in a different manner.

By way of example, one or more of the storage communications can include MODE SENSE or MODE SELECT storage system interface commands, which are SCSI commands that allow reading and writing of specific configuration parameters. More particularly, the security agent 106 can issue one or more vendor-specific MODE SENSE commands to check if there are any new instructions for it on the command and control server 115. If there are, the command and control server can send a command or other information in a MODE SENSE response. In order to convey additional information to the security agent 106, the MODE SENSE response from the command and control server 115 may include an address that the security agent will read in order to obtain the additional information. In order to transfer information to the command and control server 115, the security agent 106 can perform a vendor-specific MODE SELECT command to write the information to a specific block. The block can be predefined or chosen dynamically by a previous MODE SENSE command. For example, the command and control server 115 can use the MODE SENSE command to identify a block that has not yet been written by any other deployed security agent. These and other MODE SENSE or MODE SELECT commands can be implemented using a key-value structure in which the key identifies the command and the value comprises command data.

It is to be appreciated, however, that MODE SENSE and MODE SELECT commands are not requirements, and numerous other types of storage communication formats can be used in other embodiments. Although some embodiments utilize storage commands, other embodiments can use different types of storage communications to support covert storage channel communication between the security agent 106 and the command and control server 115. Such storage communications can utilize any storage protocol available to the potentially infected machine 102 and its associated storage system 104. In some embodiments, intercepted storage commands or other storage communications are replaced with other types of content prior to being forwarded to the command and control server 115.

In some embodiments, the communication protocol between the security agent 106 and the command and control server 115 is configured to utilize a dedicated or otherwise predetermined address space comprising a particular address or set of addresses. Such an arrangement can be used, for example, to reduce overhead by scanning only those SCSI commands that relate to a known location in the storage volume 124 instead of scanning all SCSI commands associated with the storage channel 110. Also, the security agent 106 can scan the dedicated or otherwise predetermined address space in order to receive from the command and control server 115 information relating to potential malware infections. This scan can be configured to occur at boot time of the machine 102, before the malware infection can occur, thereby effectively preventing infection of the machine 102.

Although the storage channel 110 is illustratively shown as being arranged between the potentially infected machine 102 and the storage system 104 in the FIG. 1 embodiment, such a storage channel may be implemented at least in part within the storage system 104 or on a related processing device. For example, in some embodiments, at least portions of the storage channel 110 can be part of the storage array 114. Portions of the storage channel functionality may therefore be part of the storage system 104. Alternatively, it can be part of a network storage virtualization platform, such as a VPLEX® platform commercially available from EMC Corporation. In other embodiments, the storage channel 110 is implemented as part of the hypervisor infrastructure that is used to provide the potentially infected machine 102 and other host devices as respective virtual machines. It is generally desirable in these and other similar embodiments that the storage communication interception mechanism of the storage channel 110 not be implemented on the potentially infected machine itself. This will help to ensure that the interception mechanism is not apparent to attackers.

The term "storage channel" as used herein is intended to be broadly construed, so as to encompass any of a variety of arrangements in which storage communications can be carried between a host device and a storage system.

For example, the potentially infected machine 102 may comprise a virtual machine implemented utilizing a hypervisor, with the storage channel 110 comprising an IO device driver associated with the hypervisor and providing an interface between the virtual machine and the storage system 104. A more particular example of an arrangement of this type will be described in conjunction with the illustrative embodiment of FIG. 3. Numerous other storage channel arrangements are possible in other embodiments.

The network security system 105 can respond to covert storage communications received from the potentially infected machine 102 over the storage channel 110. For example, the network security system 105 can provide commands, binaries and other information to the security agent 106 via the storage channel 110. It is also possible that the security agent 106 itself can be deployed on the potentially infected machine 102 via the storage channel 110 under the control of the network security system 105.

It is to be understood that the particular set of elements shown in FIG. 1 for providing covert storage communications is presented by way of illustrative example only, and in other embodiments additional or alternative elements may be used. Thus, another embodiment may include additional or alternative systems, devices and other network entities, as well as different arrangements of modules and other components.

In some embodiments, the network security system 105 is a part of or otherwise associated with another system, such as, for example, a security operations center (SOC) or a critical incident response center (CIRC).

Additionally or alternatively, the network security system 105 can be part of or incorporate an otherwise conventional security analytics system, such as the RSA Security Analytics system commercially available from RSA, The Security Division of EMC Corporation of Hopkinton, Mass.

Other embodiments can implement the network security system 105 and its associated command and control server 115 as part of or in conjunction with a security information and event management (SIEM), such as the enVision® platform, also commercially available from RSA. In such embodiments, at least portions of the network security system database illustratively comprise security logs collected by the SIEM system.

An exemplary process for covert storage channel communication in a computer network will now be described in more detail with reference to the flow diagram of FIG. 2. It is to be understood that this particular process is only an example, and additional or alternative processes can be carried out in other embodiments.

In this embodiment, the process includes steps 200 through 208. These steps are performed by one or more processing devices. For example, in some implementations, the steps are performed by a processing device that implements at least a portion of the storage channel 110 of the FIG. 1 embodiment. This processing device may comprise the processing device that provides the storage array 114 of the storage system 104 or another related processing device. Other arrangements of one or more processing devices can be configured to perform the process steps in other embodiments.

In step 200, a storage communication directed over a storage channel between a potentially infected machine and an associated storage system is intercepted. With reference to the FIG. 1 embodiment, the storage communication is intercepted in the storage channel 110, which is illustratively shown as separate from the potentially infected machine 102 and the storage system 104, although as indicated previously at least a portion of the storage channel 110 can alternatively be implemented in the storage system 104. The storage interception functionality associated with the storage channel 110 is illustratively implemented outside of the potentially infected machine 102, such as in the storage array 114 or a related processing device, but other portions of the storage channel 110 in some embodiments can be implemented at least in part within the potentially infected machine 102.

In step 202, a determination is made as to whether or not the intercepted storage communication is from a security agent deployed on the potentially infected machine. In the context of computer network 100, it is determined whether or not the intercepted storage communication originates from the security agent 106.

In step 204, if the intercepted storage communication is from the security agent, at least a portion of the communication is provided to a security system. For example, intercepted storage communications determined to be from the security agent 106 in the FIG. 1 embodiment can be automatically provided in whole or in part to the command and control server 115 of the network security system 105. It should be noted in this regard that additional conditions may be imposed before the intercepted communication is provided to the network security system. For example, in some embodiments it may be desirable to allow the security agent 106 to additionally communicate in a normal manner with the storage array 114. Thus, intercepted storage communications determined to be from the security agent 106 may only be provided to the network security system if one or more additional conditions are satisfied, such as the intercepted communication having a particular format or include a designated command or other type of predetermined information. Also, a given intercepted storage communication need not be provided in its entirety to the network security system 105. Instead, relevant information may be extracted from that communication and only the relevant information provided to the network security system.

In step 206, if the intercepted storage communication is not from the security agent, the communication is forwarded to the storage system. Thus, again in the context of the FIG. 1 embodiment, if a given intercepted storage channel communication is determined to not be from the security agent 106, it is processed in the ordinary manner and provided to the storage array 114 of the storage system 104. It should be noted that terms such as "forwarded" and "forwarding" as used herein with reference to storage channel communications should not be viewed as limited to arrangements in which the entire storage channel communication is provided to a receiving entity. For example, various types of processing may be applied in some embodiments which result in only a portion of the storage channel communication being provided to the receiving entity, and these and other arrangements are considered types of forwarding as that term is broadly used herein.

In step 208, an optional response or other information is provided from the network security system to the security agent via the storage channel. For example, the command and control server 115 of the network security system 105 in the FIG. 1 embodiment can provide commands, binaries or other information back to the security agent 106 in response to receipt of a given storage channel communication from the security agent 106. Additionally or alternatively, the network security system 105 can itself initiate one or more storage communications that are directed to the security agent 106.

Figure 2:
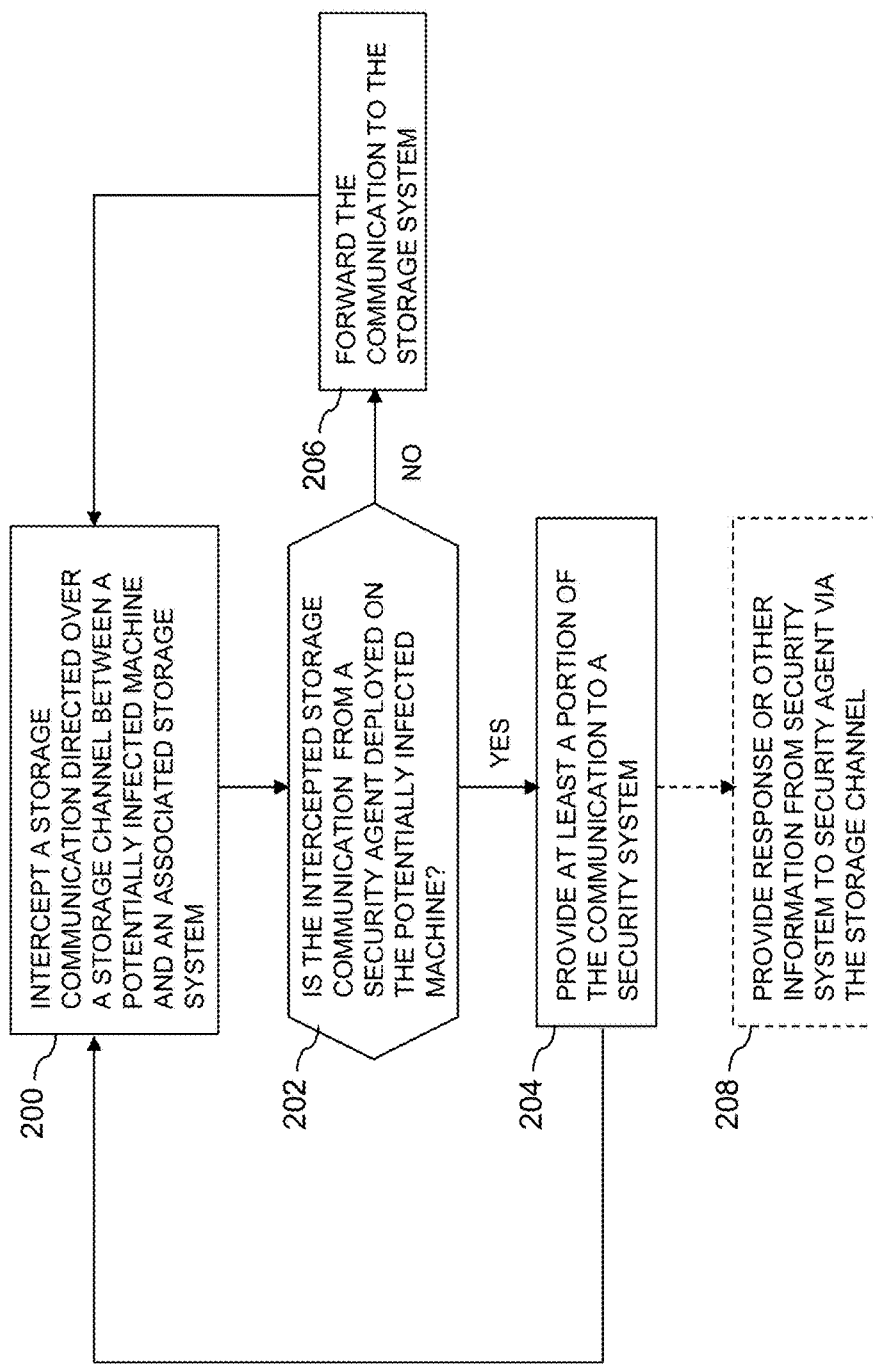
FIG. 2 is a flow diagram of an example process for covert communication between a security agent and a security system via a storage channel in an illustrative embodiment.

In the FIG. 2 process, a security agent is configured to communicate with a security system using storage communications sent over a storage channel in a manner that avoids detection of the security agent by malware that may be installed on the machine and configured to monitor network communications. As a result, a network security system can deploy and communicate with security agents on potentially infected machines without alarming malware that may be resident on those machines.

In some embodiments, the network security system can take one or more proactive measures to prevent malware infection in one or more of the host devices based at least in part on information received from deployed security agents. For example, investigation of alerts generated by various security products deployed within an enterprise can be prioritized based on information communicated by security agents. Other types of preventive or remedial measures may be taken in other embodiments.

The particular processing operations and other functionality described in conjunction with the flow diagram of FIG. 2 are presented by way of illustrative example only, and should not be construed as limiting the scope of the invention in any way. Alternative embodiments can use other types of processing operations to implement covert storage channel communication in a computer network. For example, the ordering of the process steps may be varied in other embodiments, or certain steps may be performed concurrently with one another rather than serially. Also, the process steps or subsets thereof may be repeated periodically in conjunction with respective distinct instances of covert storage channel communication within a computer network, and multiple instances of the process can be carried out for covert storage channel communication with respective multiple host devices.

Figure 3:
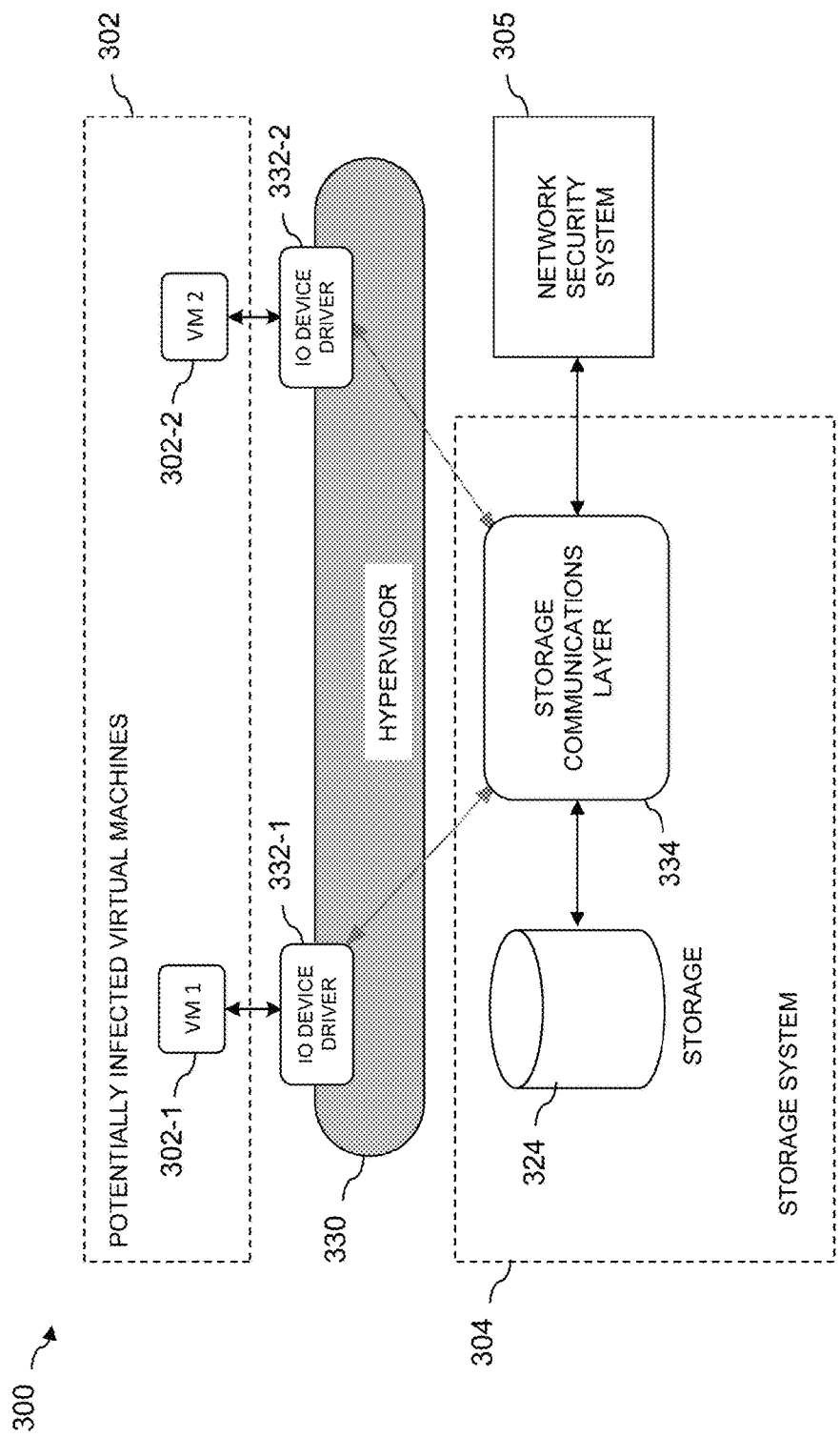
FIG. 3 shows another illustrative embodiment configured for covert storage channel communication between a security agent and a security system.

FIG. 3 shows another illustrative embodiment. In this embodiment, a computer network 300 comprises a set of potentially infected virtual machines 302. The virtual machines 302 more particularly comprise respective first and second virtual machines 302-1 and 302-2, also denoted as VM 1 and VM 2. The computer network 300 further comprises a storage system 304 and a network security system 305. The storage system 304 comprises a storage volume 324 that is accessed by the virtual machines 302. The virtual machines 302 are implemented utilizing a hypervisor 330.

Each of the virtual machines 302-1 and 302-2 communicates with the storage system 104 via a corresponding storage channel. The storage channel for a given one of the virtual machines 302-1 or 302-2 includes an IO device driver 332-1 or 332-2 associated with the hypervisor 330. Each of the IO device drivers 332 is configured to provide an interface between its corresponding virtual machine and the storage system 304. The storage channel further comprises at least a portion of a storage communications layer 334 associated with the storage system 304 as illustrated. The IO device drivers 332 are coupled between their respective virtual machines 302 and the storage communications layer 334. The IO device drivers 332 and the storage communications layer 334 collectively perform intercepting, determining, providing and forwarding operations similar to those described in conjunction with respective steps 200, 202, 204 and 206 of the FIG. 2 process.

The IO device drivers 332 illustratively comprise respective IOVP drivers, where IOVP denotes the IO Vendor Partner package of VMware® which supports IO device drivers suitable for use with a VMware® vSphere® hypervisor such as the ESXi hypervisor. In such an implementation, IO requests from the virtual machines 302 passing through the respective IOVP drivers are intercepted by those drivers and redirected to the storage communications layer 334. This IO request interception mechanism is illustratively located outside of the hypervisor kernel and allows third parties to intercept and adjust storage commands sent from the virtual machines 302. Moreover, it operates entirely outside of the virtual machines 302 and those virtual machines are oblivious to it. The storage communications layer 334 works in conjunction with the IOVP drivers to determine if a given IO request is a regular IO request that should be directed to storage volume 324 or a covert storage channel communication that should be directed to the network security system 305 for processing. Other types of IO device drivers and associated hypervisors can be used in other embodiments. Also, the above-described functionality of the IO device drivers 332 and the storage communications layer 334 can be combined into a single component in other embodiments.

The storage communications layer 334 in some embodiments is implemented at least in part utilizing software-defined storage. The software-defined storage may be implemented using software-defined storage products such as ScaleIO™ or ViPR® both of which are commercially available from EMC Corporation.

For example, implementations utilizing ScaleIO™ for the software-defined storage of storage system 304 can advantageously support large numbers of virtual machines, overcoming scalability limitations inherent in certain conventional systems. Also, failure protection functionality provided by ScaleIO™ can be used to protect the virtual machines from failures in their allocated storage resources.

The storage communications layer 334 can illustratively utilize software-defined storage such as ScaleIO™ to route designated commands or other information extracted from storage communications received from a security agent to the network security system 305. This can be achieved in a manner that does not alter or undermine the normal storage functionality of the storage system 304 in any way.

Additional details regarding ScaleIO™ functionality that can be incorporated into software-defined storage in illustrative embodiments can be found in, for example, EMC ScaleIO™ User Guide, V1.32, Document No. 302-001-033, Rev. 11, May 2015, which is incorporated by reference herein.

The FIG. 3 embodiment is an example of one possible arrangement in which the covert storage channel communication is implemented in a virtual environment by using existing extension points in a hypervisor storage stack. Numerous other implementations are possible. For example, in some embodiments, VMWare® tools or similar technologies for other types of hypervisors such as HyperV or KVM can be used to allow execution of files on the virtual machines in a manner that does not generate network communications traffic that could be detected by malware on those machines. As a more particular example, in the case of a HyperV implementation, a storage filter driver may be used to provide the storage communication interception functionality. It is also possible in some embodiments to deploy the security agent using auto-run files distributed using a CD or USB. Another option in some embodiments is to deploy the security agent using an Intelligent Platform Management Interface (IPMI) or a similar IPMI-like interface.

The above-described illustrative embodiments provide significant advantages relative to conventional approaches.

For example, certain embodiments provide an ability to deploy and communicate with security agents on potentially infected machines through covert storage channel communications that are not readily detectable by malware. The resulting hidden communications facilitate implementation of defensive mechanisms thereby resulting in enhanced security within a computer network. For example, the covert storage channel communication can allow a network security system to deploy a given security agent on a potentially infected machine, to orchestrate the security agent by passing commands and binaries to the agent, and to gather intelligence on the malware from the agent, all without exposing the interaction between the network security system and the agent to the malware.

In addition, the covert storage channel communication can be implemented with little or no significant impact to ordinary storage communications and the associated storage performance of the storage system.

Moreover, these advantages are achieved without requiring deployment of special hardware or firmware entities, which would be impractical to deploy in physical machines and even more difficult to deploy in virtual machines.

It is to be appreciated that the foregoing advantages are illustrative of advantages provided in certain embodiments, and need not be present in other embodiments.

As mentioned previously, at least portions of the computer network 100 may be implemented using one or more processing platforms. Illustrative embodiments of such platforms will now be described in greater detail. Although described in the context of computer network 100, these platforms may also be used to implement at least portions of other computer networks in other embodiments of the invention, including by way of example the computer network 300 of FIG. 3.

Figure 4:
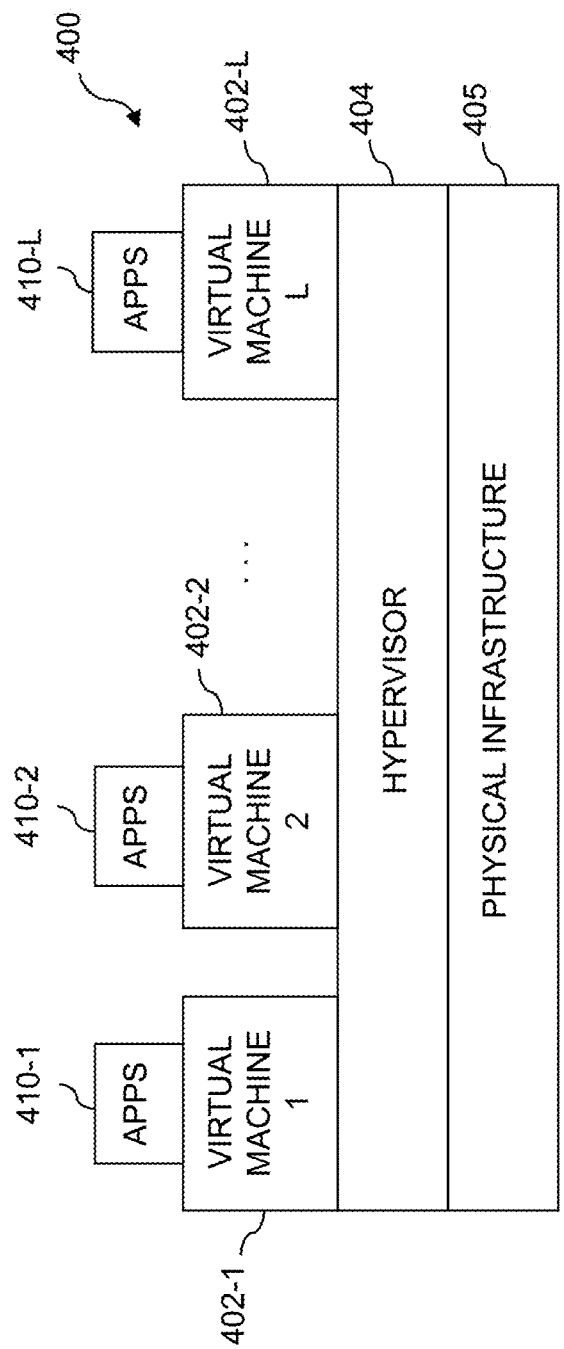
FIGS. 4 and 5 show examples of processing platforms that may be utilized to implement at least a portion of one or more of the embodiments of FIGS. 1 and 3.

FIG. 4 shows an example processing platform comprising cloud infrastructure 400. The cloud infrastructure 400 comprises a combination of physical and virtual processing resources that may be utilized to implement at least a portion of the computer network 100 in illustrative embodiments. The cloud infrastructure 400 comprises virtual machines (VMs) 402-1, 402-2, . . . 402-L implemented using a hypervisor 404. The hypervisor 404 runs on physical infrastructure 405. The cloud infrastructure 400 further comprises sets of applications 410-1, 410-2, . . . 410-L running on respective ones of the virtual machines 402-1, 402-2, . . . 402-L under the control of the hypervisor 404.

Although only a single hypervisor 404 is shown in the embodiment of FIG. 4, the computer network 100 may of course include multiple hypervisors each providing a set of virtual machines using at least one underlying physical machine. Different sets of virtual machines provided by one or more hypervisors may be utilized in configuring multiple instances of various components of the computer network 100.

An example of a commercially available hypervisor platform that may be used to implement hypervisor 404 and possibly other portions of the computer network 100 in one or more embodiments of the invention is the VMwarex® vSphere® which may have an associated virtual infrastructure management system such as the VMware® vCenter™. The underlying physical machines may comprise one or more distributed processing platforms that include one or more storage systems.

As mentioned previously, such storage systems can comprise any of a variety of different types of storage including NAS, SANs, DAS, distributed DAS and software-defined storage, implemented using various types of storage products.

Figure 5:
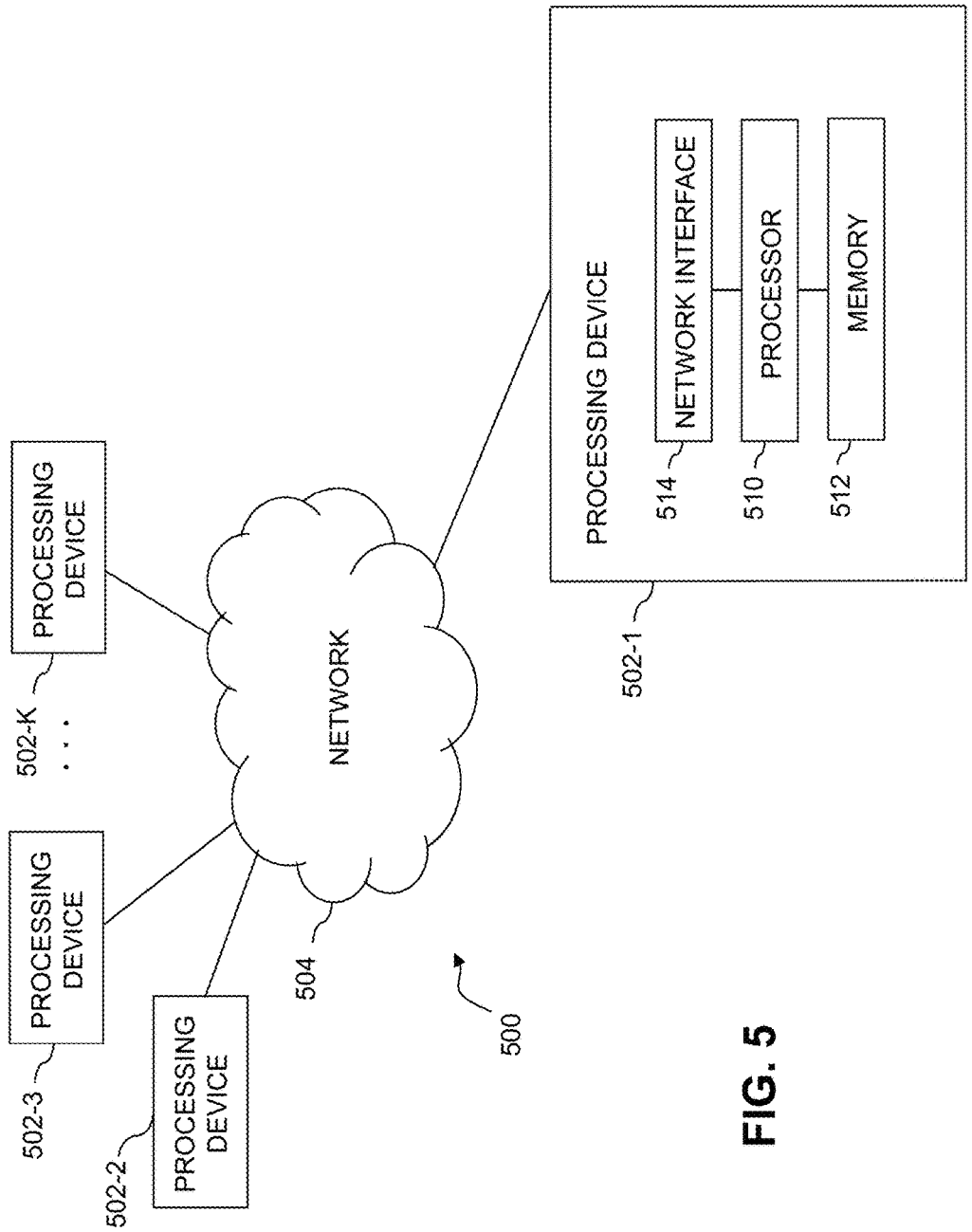

One or more of the processing modules or other components of computer network 100 may therefore each run on a computer, server, storage device or other processing platform element. A given such element may be viewed as an example of what is more generally referred to herein as a "processing device." The cloud infrastructure 400 shown in FIG. 4 may represent at least a portion of one processing platform. Another example of such a processing platform is processing platform 500 shown in FIG. 5.

The processing platform 500 in this embodiment comprises a portion of computer network 100 and includes a plurality of processing devices, denoted 502-1, 502-2, 502-3, . . . 502-K, which communicate with one another over a network 504.

The network 504 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 502-1 in the processing platform 500 comprises a processor 510 coupled to a memory 512.

The processor 510 may comprise a microprocessor, a microcontroller, an application-specific integrated circuit (ASIC), a field-programmable gate array (FPGA) or other type of processing circuitry, as well as portions or combinations of such circuitry elements.

The memory 512 may comprise random access memory (RAM), read-only memory (ROM) or other types of memory, in any combination. The memory 512 and other memories disclosed herein should be viewed as illustrative examples of what are more generally referred to as "processor-readable storage media" storing executable program code of one or more software programs.

Articles of manufacture comprising such processor-readable storage media are considered embodiments of the present invention. A given such article of manufacture may comprise, for example, a storage array, a storage disk or an integrated circuit containing RAM, ROM or other electronic memory, or any of a wide variety of other types of computer program products. The term "article of manufacture" as used herein should be understood to exclude transitory, propagating signals.

Additional or alternative computer program products not necessarily comprising articles of manufacture are also considered embodiments of the present invention. Accordingly, numerous other types of computer program products comprising processor-readable storage media can be used in illustrative embodiments.

Also included in the processing device 502-1 is network interface circuitry 514, which is used to interface the processing device with the network 504 and other system components, and may comprise conventional transceivers.

The other processing devices 502 of the processing platform 500 are assumed to be configured in a manner similar to that shown for processing device 502-1 in the figure.

Again, the particular processing platform 500 shown in the figure is presented by way of example only, and computer network 100 may include additional or alternative processing platforms, as well as numerous distinct processing platforms in any combination, with each such platform comprising one or more computers, servers, storage devices or other processing devices.

For example, other processing platforms used to implement embodiments of the invention can comprise different types of virtualization infrastructure, in place of or in addition to virtualization infrastructure comprising virtual machines. Such virtualization infrastructure illustratively includes container-based virtualization infrastructure configured to implement Docker containers or other types of Linux containers (LXCs).

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in the computer network 100. Such components can communicate with other elements of the computer network 100 over any type of network or other communication media.

It should again be emphasized that the above-described embodiments of the invention are presented for purposes of illustration only. Many variations and other alternative embodiments may be used. For example, the disclosed techniques are applicable to a wide variety of other types of computer networks in which it is desirable to facilitate covert communication between security agents and a security system. Also, the particular configurations of system and device elements shown in the figures can be varied in other embodiments. Thus, for example, the particular types of host devices, security agents, security systems, storage systems and storage channels deployed in a given embodiment and their respective configurations may be varied. Moreover, the various assumptions made above in the course of describing the illustrative embodiments should also be viewed as examples rather than as requirements or limitations of the invention. Numerous other alternative embodiments within the scope of the appended claims will be readily apparent to those skilled in the art.

What is claimed is:

1. A method comprising steps of:
   intercepting a storage communication directed over a storage channel between a potentially infected machine and an associated storage system that is external to the potentially infected machine;
   determining if the intercepted storage communication is from a security agent deployed on the potentially infected machine;
   if the intercepted storage communication is from the security agent, providing at least a portion of the communication to a security system; and
   if the intercepted storage communication is not from the security agent, forwarding the communication to the storage system;
   wherein the storage channel is configured such that storage communications of a first type utilizing a first format are detectable in the storage channel as being from the security agent and storage communications of a second type utilizing a second format different than the first format are detectable in the storage channel as not being from the security agent;
   the security agent thereby being configured to communicate with the security system using storage communications sent over the storage channel in a manner that avoids detection of the security agent by malware that may be installed on the machine and configured to monitor network communications;
   wherein one or more automated measures are carried out under the control of the security system to prevent or mitigate malware infection in the potentially infected machine based at least in part on information received from the security agent in one or more of the storage communications sent over the storage channel; and
   wherein the intercepting, determining, providing and forwarding steps are performed by at least one processing device comprising a processor coupled to a memory.

2. The method of claim 1 wherein the security system comprises at least one command and control server that communicates via the storage channel with the security agent.

3. The method of claim 2 wherein providing at least a portion of the communication to the security system comprises providing at least a portion of the communication to the command and control server of the security system.

4. The method of claim 1 wherein the storage communication is in the format of an input-output request.

5. The method of claim 1 wherein the storage channel comprises a storage communications layer associated with the storage system and implemented at least in part on said at least one processing device.

6. The method of claim 5 wherein the storage communications layer is implemented at least in part utilizing software-defined storage.

7. The method of claim 5 wherein the storage channel further comprises an input-output device driver coupled between the machine and the storage communications layer.

8. The method of claim 7 wherein the input-output device driver and the storage communications layer collectively perform the intercepting, determining, providing and forwarding steps.

9. The method of claim 1 wherein the potentially infected machine comprises a virtual machine implemented utilizing a hypervisor and further wherein the storage channel comprises an input-output device driver associated with the hypervisor and providing an interface between the virtual machine and the storage system.

10. The method of claim 1 further comprising providing a response to the communication from the security system to the security agent via the storage channel.

11. The method of claim 1 further comprising providing at least one of a command and a binary from the security system to the security agent via the storage channel.

12. The method of claim 1 further comprising deploying the security agent on the machine via the storage channel under the control of the security system.

13. The method of claim 1 wherein the storage communications include one or more MODE SENSE or MODE SELECT storage system interface commands.

14. The method of claim 1 further comprising utilizing a predetermined address space of the storage system to support communication between the security agent and the security system, wherein the intercepting and determining comprise scanning one or more storage commands involving the predetermined address space.

15. A computer program product comprising a non-transitory processor-readable storage medium having stored therein program code of one or more software programs, wherein the program code when executed by at least one processing device causes said at least one processing device:

to intercept a storage communication directed over a storage channel between a potentially infected machine and an associated storage system that is external to the potentially infected machine;

to determine if the intercepted storage communication is from a security agent deployed on the potentially infected machine;

if the intercepted storage communication is from the security agent, to provide at least a portion of the communication to a security system; and if the intercepted storage communication is not from the security agent, to forward the communication to the storage system;

wherein the storage channel is configured such that storage communications of a first type utilizing a first format are detectable in the storage channel as being from the security agent and storage communications of a second type utilizing a second format different than the first format are detectable in the storage channel as not being from the security agent;

the security agent thereby being configured to communicate with the security system using storage communications sent over the storage channel in a manner that avoids detection of the security agent by malware that may be installed on the machine and configured to monitor network communications;

wherein one or more automated measures are carried out under the control of the security system to prevent or mitigate malware infection in the potentially infected machine based at least in part on information received from the security agent in one or more of the storage communications sent over the storage channel.

16. The computer program product of claim 15 wherein the program code when executed by at least one processing device further causes said at least one processing device to provide a response to the communication from the security system to the security agent via the storage channel.

17. The computer program product of claim 15 wherein the program code when executed by at least one processing device further causes said at least one processing device to provide at least one of a command and a binary from the security system to the security agent via the storage channel.

18. An apparatus comprising:

at least one processing device comprising a processor coupled to a memory;

said at least one processing device being configured:

to intercept a storage communication directed over a storage channel between a potentially infected machine and an associated storage system that is external to the potentially infected machine;

to determine if the intercepted storage communication is from a security agent deployed on the potentially infected machine;

if the intercepted storage communication is from the security agent, to provide at least a portion of the communication to a security system; and if the intercepted storage communication is not from the security agent, to forward the communication to the storage system;

wherein the storage channel is configured such that storage communications of a first type utilizing a first format are detectable in the storage channel as being from the security agent and storage communications of a second type utilizing a second format different than the first format are detectable in the storage channel as not being from the security agent;

the security agent thereby being configured to communicate with the security system using storage communications sent over the storage channel in a manner that avoids detection of the security agent by malware that may be installed on the machine and configured to monitor network communications;

wherein one or more automated measures are carried out under the control of the security system to prevent or mitigate malware infection in the potentially infected machine based at least in part on information received from the security agent in one or more of the storage communications sent over the storage channel.

19. The apparatus of claim 18 wherein the storage channel comprises a storage communications layer associated with the storage system and implemented at least in part on said at least one processing device.

20. The apparatus of claim 19 wherein the storage channel further comprises an input-output device driver coupled between the machine and the storage communications layer.

\* \* \* \* \*